(12) United States Patent  
Yamaguchi

(10) Patent No.: US 12,148,577 B2  
(45) Date of Patent: Nov. 19, 2024

(54) ELECTROLYTIC CAPACITOR

(71) Applicant: Panasonic Intellectual Property Management Co., Ltd., Osaka (JP)

(72) Inventor: Nobuyuki Yamaguchi, Saga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 44 days.

(21) Appl. No.: 17/821,700

(22) Filed: Aug. 23, 2022

(65) Prior Publication Data

US 2023/0010854 A1  Jan. 12, 2023

Related U.S. Application Data

(63) Continuation of application No. PCT/JP2021/010994, filed on Mar. 18, 2021.

(30) Foreign Application Priority Data

Mar. 23, 2020  (JP) ................................. 2020-050693

(51) Int. Cl.
  *H01G 9/012* (2006.01)
  *H01G 9/15* (2006.01)

(52) U.S. Cl.
  CPC .............. *H01G 9/012* (2013.01); *H01G 9/15* (2013.01)

(58) Field of Classification Search
  CPC ................................. H01G 9/012; H01G 9/15
  See application file for complete search history.

(56) References Cited

U.S. PATENT DOCUMENTS

| | | | |
|---|---|---|---|
| 6,751,086 B2* | 6/2004 | Matsumoto | H01G 9/15 361/523 |
| 7,468,882 B2* | 12/2008 | Marek | H01G 9/15 361/535 |
| 10,410,796 B2* | 9/2019 | Kobashi | H01G 9/012 |
| 11,145,468 B2* | 10/2021 | Yamada | H01G 9/10 |

(Continued)

FOREIGN PATENT DOCUMENTS

| | | | | |
|---|---|---|---|---|
| CN | 102683027 A | * | 9/2012 | ............. H01G 9/012 |
| CN | 111210994 A | | 5/2020 | |

(Continued)

OTHER PUBLICATIONS

International Search Report of PCT application No. PCT/JP2021/010994 dated Jun. 15, 2021.

(Continued)

*Primary Examiner* — Dion R. Ferguson

(74) *Attorney, Agent, or Firm* — Rimon P.C.

(57) ABSTRACT

An electrolytic capacitor includes a capacitor element, an anode lead terminal, a cathode lead terminal, and an exterior body. The anode lead terminal includes an anode terminal part and a first upright part. The first upright part includes two exposed parts and a bent part disposed between the two exposed parts. The two exposed parts are connected to the anode terminal part and exposed from the exterior body The bent part includes a recess at a tip of the bent part. The bent part is bent toward a first end surface of the capacitor element so that the recess is disposed in the exterior body. An anode lead is connected to the recess of the bent part.

10 Claims, 7 Drawing Sheets

(56) References Cited

U.S. PATENT DOCUMENTS

| | | | | |
|---|---|---|---|---|
| 2003/0174460 A1* | 9/2003 | Sano | ........................ | H01G 2/02 361/523 |
| 2004/0201949 A1* | 10/2004 | Kida | ........................ | H01G 9/042 361/306.1 |
| 2007/0081301 A1* | 4/2007 | Tanaka | .................... | H01G 2/065 361/540 |
| 2011/0249375 A1* | 10/2011 | Matsuoka | ................ | H01G 9/10 29/25.03 |
| 2014/0043730 A1* | 2/2014 | Kim | ........................ | H01G 9/15 29/25.03 |
| 2015/0077904 A1 | 3/2015 | Kwak et al. | | |
| 2015/0116909 A1* | 4/2015 | Kwak | .................... | H01G 9/012 361/529 |
| 2015/0325379 A1* | 11/2015 | Park | ........................ | H01G 9/012 29/25.03 |
| 2015/0364263 A1* | 12/2015 | Petrzilek | ................ | H01G 9/012 205/199 |
| 2018/0204681 A1* | 7/2018 | Kobashi | .................... | H01G 9/10 |
| 2020/0168405 A1 | 5/2020 | Shin et al. | | |
| 2023/0010854 A1* | 1/2023 | Yamaguchi | ............ | H01G 9/012 |

FOREIGN PATENT DOCUMENTS

| | | |
|---|---|---|
| JP | 54-128051 U | 9/1979 |
| JP | 59-004629 U | 1/1984 |
| JP | 2002-075807 | 3/2002 |
| JP | 2015-088718 | 5/2015 |
| JP | 2015-216340 | 12/2015 |

OTHER PUBLICATIONS

English Translation of Chinese Office Action dated Jul. 20, 2024 for the related Chinese Patent Application No. 202180020448.8.

\* cited by examiner

ELECTROLYTIC CAPACITOR

BACKGROUND

1. Technical Field

The present disclosure relates to an electrolytic capacitor.

2. Description of the Related Art

Electrolytic capacitors are mounted on various electronic devices. An electrolytic capacitor usually includes a capacitor element, an anode lead terminal, a cathode lead terminal, and an exterior body covering the capacitor element. The capacitor element includes an anode part and a cathode part. The anode lead terminal is electrically connected to the anode part, and the cathode lead terminal is electrically connected to the cathode part.

Conventionally, anode lead terminals having various shapes have been proposed (for example, Unexamined Japanese Utility Model Publication No. S59-004629 and Unexamined Japanese Patent Publication No. 2015-088718). Unexamined Japanese Utility Model Publication No. S59-004629 discloses an anode terminal formed by a metal sheet having an L-shaped cross section and including a horizontal piece and a vertical piece. The vertical piece of the metal sheet is divided into three, and a central piece of the vertical piece is bent inward by 180° so that a tip of the central piece is in contact with the horizontal piece. An anode lead wire of the capacitor element is welded to a fold of the bent central piece. Unexamined Japanese Patent Publication No. 2015-088718 discloses "an anode lead frame including an anode terminal part and an anode connection part formed by bending a part of the anode terminal part in a direction of one side from an outside toward an inside, the anode connection part being connected to the tantalum wire".

SUMMARY

One aspect of the present disclosure relates to an electrolytic capacitor. The electrolytic capacitor includes a bottom surface, a front surface rising from the bottom surface, and a rear surface opposite to the front surface. The electrolytic capacitor includes: a capacitor element including a first end surface facing the front surface; an anode lead terminal and a cathode lead terminal each electrically connected to the capacitor element; and an exterior body disposed around the capacitor element. The capacitor element includes an anode lead protruding from the first end surface toward the front surface. The anode lead terminal includes an anode terminal part exposed on the bottom surface, and a first upright part rising from the anode terminal part. The first upright part includes two exposed parts and a bent part disposed between the two exposed parts. The two exposed parts are connected to the anode terminal part and exposed on the front surface. The bent part includes a recess at a tip of the bent part. The bent part is bent toward the first end surface such that the recess is disposed in the exterior body. The anode lead is connected to the recess of the bent part.

According to the present disclosure, it is possible to obtain an electrolytic capacitor capable of being mounted on a substrate with high reliability and capable of connecting an anode lead and an anode lead terminal with high reliability.

DETAILED DESCRIPTIONS OF EMBODIMENT

Figure 1:
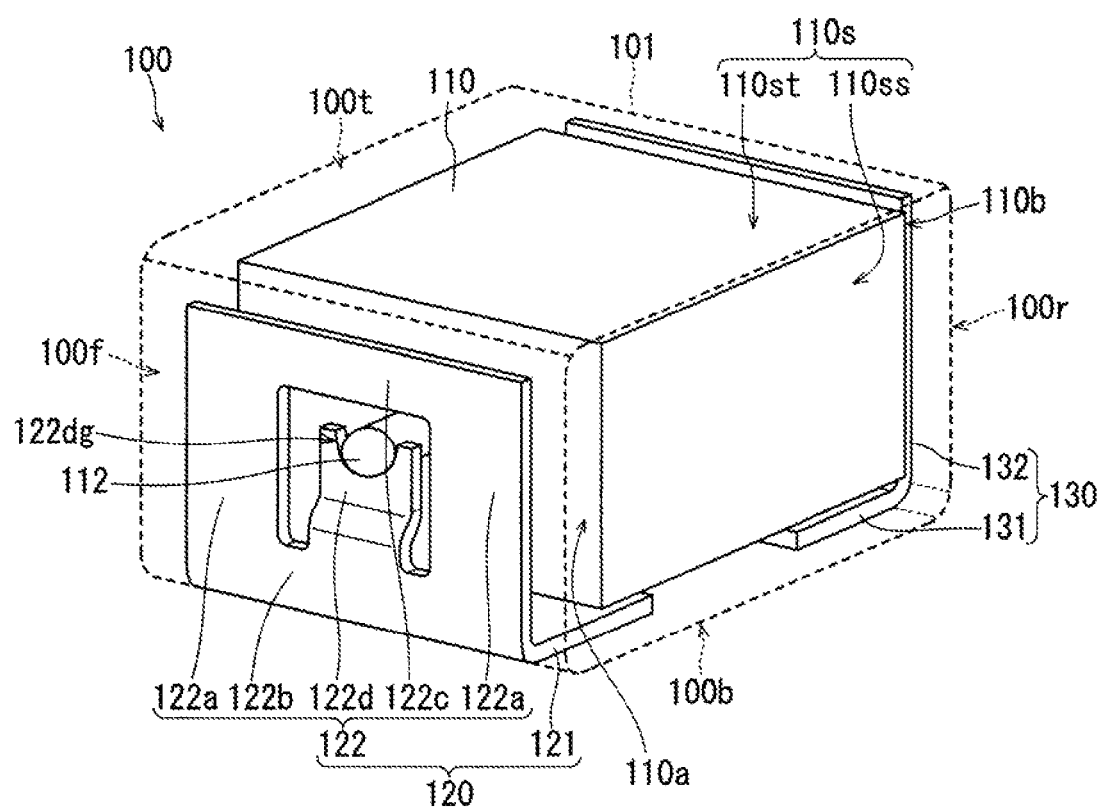
FIG. 1 is a perspective view schematically illustrating a configuration of an example of an electrolytic capacitor of the present disclosure.

Currently, an electrolytic capacitor capable of being mounted on a substrate with high reliability is required. Further, it is also required to reliably connect an anode lead and an anode lead terminal. In such a situation, the present disclosure provides an electrolytic capacitor that can be mounted on a substrate with high reliability and can connect an anode lead and an anode lead terminal with high reliability.

Hereinafter, an exemplary embodiment of the present disclosure will be described with reference to examples, but the present disclosure is not limited to examples to be described below. In the following description, specific numerical values and materials may be provided as examples, but other numerical values and materials may be applied as long as the effect of the present disclosure can be obtained. It is to be noted that constituent elements of known electrolytic capacitors may be applied to constituent elements other than parts that are characteristics of the present disclosure.

(Electrolytic Capacitor)

An electrolytic capacitor of the present disclosure includes a bottom surface, a front surface rising from the bottom surface, and a rear surface opposite to the front surface. Hereinafter, the bottom surface, the front surface, and the rear surface may be referred to as "bottom surface (B)", "front surface (F)", and "rear surface (R)", respectively. Similarly to front surface (F), rear surface (R) also rises from bottom surface (B). The electrolytic capacitor includes a capacitor element having a first end surface facing front surface (F), an anode lead terminal and a cathode lead terminal each electrically connected to the capacitor element, and an exterior body disposed around the capacitor element. The first end surface facing front surface (F) may hereinafter be referred to as "first end surface (E1)". The capacitor element includes an anode lead protruding from first end surface (E1) toward front surface (F).

(Anode Lead Terminal)

The anode lead terminal includes an anode terminal part exposed on bottom surface (B), and a first upright part rising from the anode terminal part. The first upright part includes two exposed parts and a bent part disposed between the two exposed parts. The two exposed parts are connected to the anode terminal part and exposed on front surface (F), and the bent part includes a recess at a tip of the bent part. The bent part is bent toward first end surface (E1) such that the recess is disposed in the exterior body. The anode lead is connected to the recess of the bent part.

The anode lead terminal may be formed by processing one metal sheet by a known metal processing method. The anode lead terminal can be produced by, for example, a bending process for forming the first upright part and a process for forming the bent part. The bent part can be formed, for example, by cutting a part of the metal sheet and bending the metal sheet. The bending process for forming the first upright part and the process for forming the bent part may be performed in sequence or simultaneously. Further, when the bent part is formed, a part of the metal sheet around the bent part may be removed by punching or the like.

A material of the anode lead terminal may be any material that can be used as the material of the anode lead terminal of the electrolytic capacitor. For example, a material of a known anode lead terminal used for the electrolytic capacitor may be used. The anode lead terminal may be formed by processing a metal sheet (including a metal plate and a metal foil) made of metal (copper, copper alloy, etc.). A surface of the metal sheet may be subjected to plating such as nickel plating or gold plating. A thickness of the metal sheet constituting the anode lead terminal may be in a range from 25 μm to 200 μm, inclusive (for example, in a range from 25 μm to 100 μm, inclusive).

A method of connecting the recess of the bent part and the anode lead is not particularly limited. They may be connected by a conductive adhesive or solder, or may be connected by welding. Examples of welding include resistance welding and laser welding.

In the electrolytic capacitor of the present disclosure, the anode lead terminal includes an anode terminal part exposed on bottom surface (B), and two exposed parts exposed on front surface (F). That is, the anode terminal part and the two exposed parts are continuous in an exposed state at a corner part between bottom surface (B) and front surface (F). According to this configuration, when the anode terminal part is soldered to a substrate or the like, the entire anode terminal part can be soldered in a state where the solder wraps around the exposed parts. Hence, a soldering area can be increased, and the electrolytic capacitor can be mounted on a substrate or the like with high reliability.

Furthermore, in the electrolytic capacitor of the present disclosure, the bent part is bent toward first end surface (E1) so as to be disposed in the exterior body. The anode lead terminal and the anode lead are connected to each other in the recess of the bent part. On the other hand, in Unexamined Japanese Utility Model Publication No. 59-004629, an anode lead wire (anode lead) of a capacitor element is welded to a flat fold of a bent metal sheet. Thus, as compared with the electrolytic capacitor of Unexamined Japanese Utility Model Publication No. 59-004629, a position of the anode lead is fixed by the anode lead being accommodated in the recess. Further, since the recess is positioned at a tip of the bent part, the recess does not protrude from the exterior body. Thus, in the electrolytic capacitor of the present disclosure, the anode lead terminal and the anode lead can be connected with high reliability.

Furthermore, in the electrolytic capacitor of the present disclosure, first end surface (E1) of the capacitor element can be disposed close to the bent part. Accordingly, it is possible to increase a ratio (volume ratio) of the capacitor element to the electrolytic capacitor. Thus, according to the present disclosure, it is possible to increase the capacitance of the electrolytic capacitor.

(Cathode Lead Terminal)

The cathode lead terminal is not particularly limited, and a known cathode lead terminal may be used. The cathode lead terminal may be formed by processing one metal sheet by a known metal processing method. The cathode lead terminal may be formed of the metal sheet exemplified as the material of the anode lead terminal.

A tip part of the bent part of the anode lead terminal where the recess is formed may extend substantially in a direction perpendicular to a surface of the anode terminal part. This configuration facilitates reliable reception of the anode lead in the recess, and facilitates connection between the anode lead and the recess. Note that the term "substantially in a direction perpendicular" means that angle A (see FIG. 4) formed between a direction in which the tip part extends and the surface of the anode terminal part falls within a range from 80° to 100°, inclusive (for example, a range from 85° to 95°, inclusive).

The electrolytic capacitor of the present disclosure may satisfy the following configuration (1).

(1) The first upright part of the anode lead terminal includes a lower part connecting lower ends of the two exposed parts, and the bent part extends from the lower part. According to this configuration, a length of the bent part can be shortened. Hence, it is possible to reduce deformation of the bent part as compared with an elongated anode connection part of Unexamined Japanese Patent Publication No. 2015-088718, which has a length from the anode terminal part to the tantalum wire (anode lead). Thus, according to this configuration, the anode lead terminal and the anode lead can be connected particularly reliably.

The electrolytic capacitor of the present disclosure may satisfy the following configurations (2) to (4) in addition to the configuration (1) described above. According to these configurations, the mechanical strength of the first upright part can be increased.

(2) The first upright part of the anode lead terminal includes an upper part connecting upper ends of the two exposed parts.

(3) The anode lead terminal is formed by processing one metal sheet.

(4) The bent part of the anode lead terminal is formed by bending a metal sheet surrounded by the two exposed parts, the upper part and the lower part.

The electrolytic capacitor of the present disclosure may have the following configurations (5) to (7).

(5) The capacitor element has a second end surface opposite to first end surface (E1), and a side circumferential surface connecting a peripheral edge of first end surface (E1) and a circumferential surface of the second end surface. Hereinafter, the second end surface may be referred to as "second end surface (E2)".

(6) The cathode lead terminal includes a cathode terminal part exposed on bottom surface (B), and a second upright part rising from the cathode terminal part and exposed on rear surface (R). That is, the cathode terminal part and the second upright part are continuous in an exposed state at a corner part between bottom surface (B) and rear surface (R).

(7) The cathode lead terminal and the capacitor element are connected via a conductive member disposed between the second upright part and second end surface (E2) and/or a conductive member disposed between the cathode terminal part and the side circumferential surface.

According to the configurations (5) to (7), it is not necessary to dispose the exterior body between second end surface (E2) and rear surface (R). Thus, the ratio (volume ratio) of the capacitor element to the electrolytic capacitor can be increased, and the capacitance of the electrolytic capacitor can be increased. Further, according to the configurations (5) to (7) described above, similarly to the anode terminal part, it is possible to increase a solderable area also in the cathode terminal part. Hence, it is possible to more reliably mount the electrolytic capacitor on the substrate or the like. Furthermore, according to the configurations (5) to (7), an area of the conductive member that can be disposed between a cathode part and the cathode lead terminal can be increased, and thus the electrical resistance between the cathode part and the cathode lead terminal can be reduced. Further, by disposing the first and second upright parts on the surface of the exterior body, moisture or the like can be prevented from reaching the capacitor element. Thus, the reliability of the electrolytic capacitor can be improved.

The anode lead may have a round bar shape, and the recess of the anode lead terminal may have an arc shape along a transverse outer periphery of the round bar shape of the anode lead. A position of the anode lead can be more easily fixed in the recess because the anode lead has a round bar shape, and the recess of the anode lead terminal has an arc shape along the transverse outer periphery of the round bar shape.

(Capacitor Element)

The capacitor element includes an element part having a columnar shape and including the above-described first end surface, and an anode lead protruding from the first end surface of the element part toward front surface (F). The element part may have a cylindrical or prismatic shape. The capacitor element is not particularly limited. As the capacitor element, a capacitor element used in a known solid electrolytic capacitor or a capacitor element having a similar configuration may be used. Note that the electrolytic capacitor of the present disclosure may include a plurality of the capacitor elements. In this case, anode parts of the plurality of capacitor elements are electrically connected to the anode lead terminal via the anode lead.

An example of the capacitor element includes an anode part and a cathode part. The anode part includes an anode body having a dielectric layer formed on a surface thereof and an anode lead, and the cathode part includes an electrolyte layer and a cathode layer. The electrolyte layer is disposed between the dielectric layer formed on the surface of the anode body and the cathode layer. These constituent elements are not particularly limited, and constituent elements used for known solid electrolytic capacitors may be applied. Examples of these constituent elements will be described below.

(Anode Body)

As the anode body, for example, a columnar (for example, rectangular parallelepiped) porous sintered body obtained by sintering particles of a material for the formation may be used. Examples of the particles include particles of a valve metal, particles of an alloy containing a valve metal, and particles of a compound containing a valve metal. One of these kinds of particles may be used alone, or two or more thereof may be used in mixture. As the valve metal, titanium (Ti), tantalum (Ta), niobium (Nb), or the like is used. Alternatively, the anode body may be formed by roughening a surface of a base material (such as a foil-like or plate-like base material) containing the valve metal by etching or the like.

The anode part may be produced by the following method. First, a part of an anode lead is embedded in metal powder as a material of an anode body, and the metal powder is pressure-molded into a columnar shape (for example, a rectangular parallelepiped shape). Thus, the powder of the metal is sintered to form an anode body. In this way, the anode part including the anode body and the anode lead partially embedded in the anode body can be produced.

The dielectric layer formed on the surface of the anode body is not particularly limited, and may be formed by a known method. For example, the dielectric layer may be formed by anodizing the surface of the anode body by immersing the anode body in an anodizing solution. Alternatively, the dielectric layer may be formed by heating the anode body in an atmosphere containing oxygen to oxidize the surface of the anode body.

(Anode Lead)

The anode lead may be a wire (anode wire) made of metal. Examples of a material of the anode lead include the above-described valve metal, copper, aluminum, and aluminum alloy. A part of the anode lead is embedded in the anode body, and a remaining part protrudes from the anode body. The cross-sectional shape of the anode lead is not particularly limited, and may be a circle, an ellipse, a track shape (a shape including two straight lines parallel to each other and two circular arcs connecting end parts of these straight lines), a rectangle, a polygon, or the like. Further, the cross-sectional shape of the anode lead may vary depending on the location. For example, the anode wire having a circular cross section in the vicinity of protrusion from the anode body may have a flat plate shape in which the anode wire is crushed from a circumferential direction at a tip part connected to the anode lead wire.

A tip part of the anode lead protruding from the anode body is connected to the recess of the bent part of the anode lead terminal. The tip part may have a shape different from the shape of the recess. Alternatively, the tip part may have a shape fitted in the recess. For example, when the recess has a shape including an arc, the tip part may have a circular shape.

(Electrolyte Layer)

The electrolyte layer is not particularly limited, and an electrolyte layer used in a known solid electrolytic capacitor may be applied. Note that, in this specification, the electrolyte layer may be replaced with a solid electrolyte layer, and the electrolytic capacitor may be replaced with a solid electrolytic capacitor. The electrolyte layer may be a stacked body of two or more different electrolyte layers.

The electrolyte layer is disposed so as to cover at least a part of the dielectric layer. The electrolyte layer may be formed using a manganese compound or a conductive polymer. Examples of the conductive polymer include polypyrrole, polythiophene, polyaniline, and derivatives thereof. These polymers may be used alone or in combination of a plurality of polymers. Alternatively, the conductive polymer may be a copolymer from two or more kinds of monomers. Note that the derivative of the conductive polymer means a polymer having the conductive polymer as a basic skeleton. For example, examples of the derivative of polythiophene include poly(3,4-ethylenedioxythiophene) and the like.

A dopant may be added to the conductive polymer. The dopant can be selected depending on the conductive polymer, and a known dopant may be used. Examples of the dopant include naphthalenesulfonic acid, p-toluenesulfonic acid, polystyrenesulfonic acid, and salts thereof. An example of electrolyte layer is formed using poly(3,4-ethylenedioxythiophene) (PEDOT) doped with polystyrenesulfonic acid (PSS).

The electrolyte layer containing the conductive polymer may be formed by polymerizing a raw material monomer on the dielectric layer. Alternatively, the dielectric layer may be formed by applying a liquid containing a conductive polymer (and a dopant as necessary) to the dielectric layer and then drying the liquid.

(Cathode Layer)

The cathode layer may be a conductive layer formed on the electrolyte layer, for example, may be a conductive layer formed so as to cover the electrolyte layer. The cathode layer may include a carbon layer formed on the electrolyte layer, and a metal paste layer formed on the carbon layer. The carbon layer may be formed by a conductive carbon material such as graphite, and resin. The metal paste layer may be formed by metal particles (for example, silver particles) and resin, and may be formed by, for example, a known silver paste.

The cathode layer is electrically connected to the cathode lead terminal. The cathode layer may be electrically connected to the cathode lead terminal via a conductive member. The conductive member may be formed of metal particles (for example, silver particles) and a resin, and may be formed of, for example, a known silver paste.

The cathode layer may constitute second end surface (E2) opposite to first end surface (E1). Second end surface (E2) may be connected to the second upright part of the cathode lead terminal via a conductive member. The cathode layer may be connected to the cathode terminal part via the conductive member. The cathode layer may be connected to both the cathode terminal part and the second upright part via the conductive member.

(Exterior Body)

The exterior body is disposed around the capacitor element so that the capacitor element is not exposed on the surface of the electrolytic capacitor. Further, the exterior body insulates the anode lead terminal from the cathode lead terminal. A known exterior body used for an electrolytic capacitor may be applied to the exterior body. For example, the exterior body may be formed using an insulating resin material used for sealing the capacitor element. Examples of a material of the exterior body include epoxy resin, phenol resin, silicone resin, melamine resin, urea resin, alkyd resin, polyurethane, polyimide, unsaturated polyester, and the like. The resin material constituting the exterior body may contain a substance (inorganic filler or the like) other than the resin. The exterior body may include a case disposed on at least a part of a surface of the exterior body.

Hereinafter, an example of the electrolytic capacitor of the present disclosure will be specifically described with reference to the drawings. The above-described constituent elements can be applied to constituent elements of an electrolytic capacitor as an example described below. Further, constituent elements of an electrolytic capacitor as an example described below can be changed based on the above description. Furthermore, the matters described above may be applied to the exemplary embodiments described below. In addition, in the exemplary embodiments described below, constituent elements that are not essential to the electrolytic capacitor of the present disclosure may be omitted.

First Exemplary Embodiment

Figure 2:
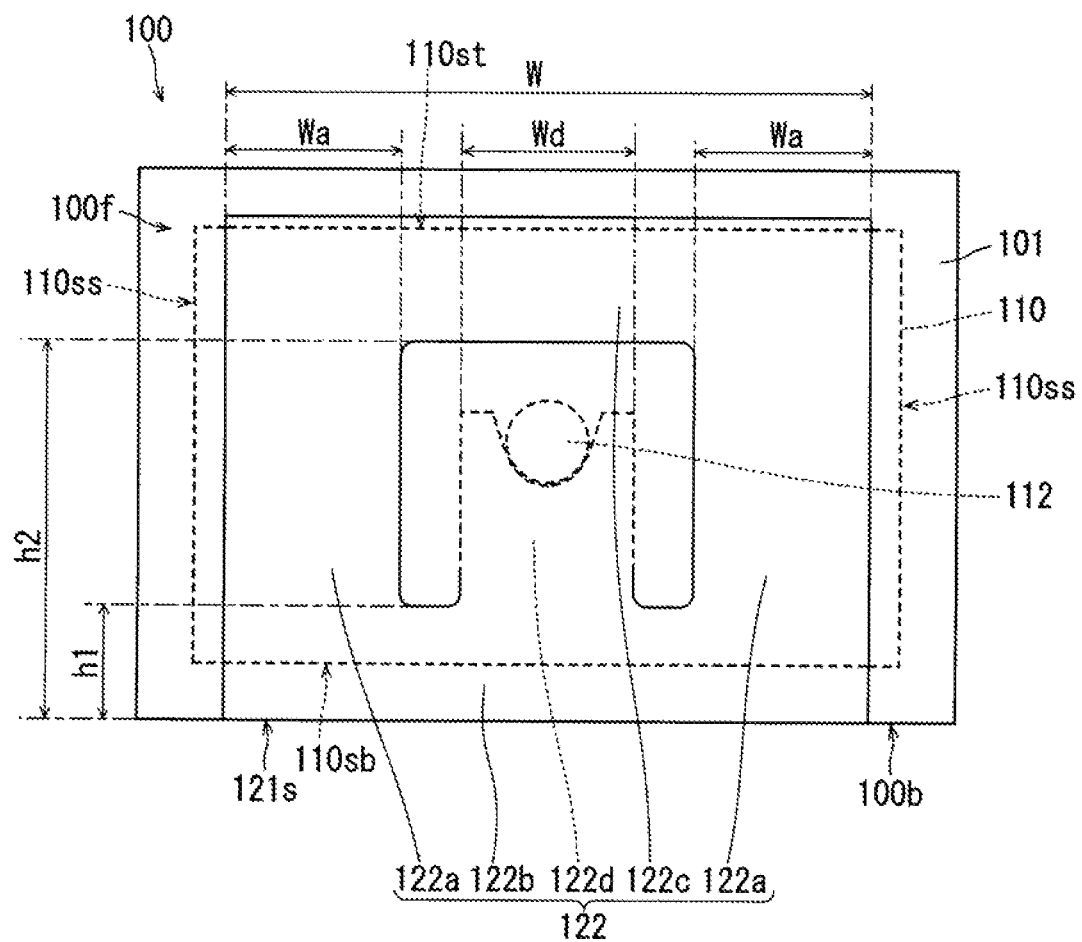
FIG. 2 is a front view schematically illustrating the electrolytic capacitor illustrated in FIG. 1.
Figure 3:
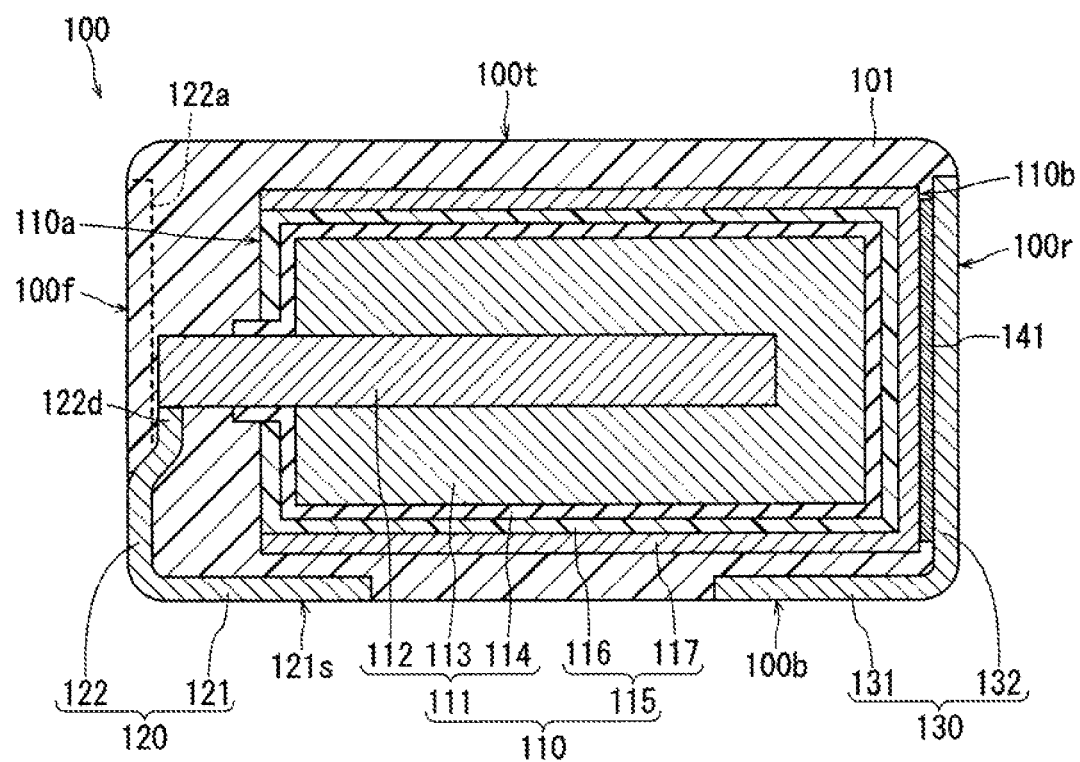
FIG. 3 is a cross-sectional view schematically illustrating the electrolytic capacitor illustrated in FIG. 1.

FIG. 1 schematically illustrates a perspective view of electrolytic capacitor 100 according to a first exemplary embodiment. FIG. 2 schematically illustrates a front view of electrolytic capacitor 100 as viewed from first upright part 122 of anode lead terminal 120. FIG. 3 schematically illustrates a cross-sectional view cut by a plane through anode lead (anode wire) 112. Note that, for convenience of understanding, some constituent elements may be indicated only by contours in the following drawings. Further, in the following drawings, illustration of some constituent elements may be omitted.

Referring to the drawings, electrolytic capacitor 100 includes capacitor element 110, exterior body 101, anode lead terminal 120, cathode lead terminal 130, and conductive member 141 (See FIG. 3). Exterior body 101 is formed so as to surround capacitor element 110.

Electrolytic capacitor 100 has bottom surface 100b, front surface 100f rising from bottom surface 100b, rear surface 100r opposite to the front surface, and top surface 100t opposite to bottom surface 100b. Capacitor element 110 includes first end surface 110a facing front surface 100f, and second end surface 110b opposite to first end surface 110a. Capacitor element 110 has side circumferential surface 110s connecting a peripheral edge of first end surface 110a and a peripheral edge of second end surface 110b. Side circumferential surface 110s includes bottom surface 110sb near bottom surface 100b, top surface 110st near top surface 100t, and two side surfaces 110ss. Capacitor element 110 includes anode lead 112 protruding from end surface 110a toward front surface 100f.

Referring to FIG. 1, anode lead terminal 120 includes anode terminal part 121 exposed on bottom surface 100b, and first upright part 122 rising from anode terminal part 121. First upright part 122 includes two exposed parts 122a, lower part 122b, upper part 122c, and bent part 122d.

Two exposed parts 122a are connected to anode terminal part 121 and are exposed on front surface 100f. Lower part 122b connects lower ends of two exposed parts 122a, and is connected to anode terminal part 121. Upper part 122c connects upper ends of two exposed parts 122a. A part of first upright part 122 excluding bent part 122d has a rectangular frame shape.

Bent part 122d is disposed between two exposed parts 122a. Bent part 122d has recess 122dg at a tip of bent part 122d. Bent part 122d extends from lower part 122b and is bent toward first end surface 110a. Specifically, bent part 122d extends from lower part 122b toward first end surface 110a, and then extends toward top surface 100t.

Figure 4:
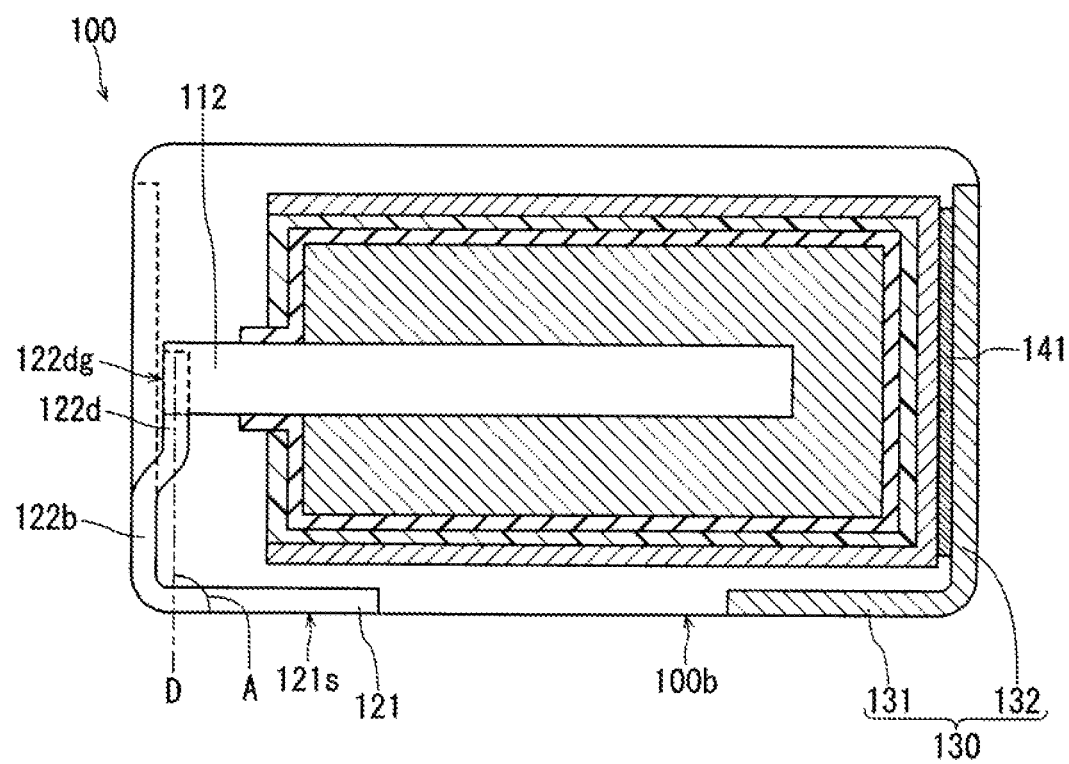
FIG. 4 is a cross-sectional view schematically illustrating a shape of some members of the electrolytic capacitor illustrated in FIG. 1.

In bent part 122d, a tip part in which recess 122dg is formed may be substantially perpendicular to a surface (exposed surface) of anode terminal part 121. Specifically, angle A (See FIG. 4) formed between direction D in which the tip part where recess 122dg is formed extends and surface 121s of anode terminal part 121 may be in a range from 80° to 100°, inclusive. Similarly to FIG. 3, FIG. 4 is a cross section cut by a plane perpendicular to bottom surface 100b and passing through a central axis of anode lead 112. Note that, in FIG. 4, hatching of some members is omitted.

Recess 122dg of bent part 122d is embedded in exterior body 101. The tip part of anode lead 112 is also embedded in exterior body 101. Recess 122dg is connected to anode lead 112 by welding or the like. In order to prevent moisture or the like from entering an inside of exterior body 101 and adversely affecting capacitor element 110, it is preferable that a connection part between bent part 122d and anode lead 112 is disposed away from front surface 100f. On the other hand, if the connection part is too far away from front surface 100f, it may be difficult to increase the capacitance. In consideration of these, a distance from front surface 100f to recess 122dg may be in a range from 50 μm to 400 μm, inclusive (for example, in a range from 100 μm to 300 inclusive).

Referring to FIG. 2, in anode terminal part 121, a height from surface 121s to anode lead 112 may be greater than height h1 from surface 121s to an upper end of lower part 122*b* of upright part 122, and may be smaller than height h2 from surface 121*s* to a lower end of upper part 122*c* of upright part 122.

Referring to FIG. 2, width Wa of each of two exposed parts 122*a* may be in a range from 20% to 40%, inclusive, of width W of upright part 122. Width Wd of bent part 122*d* may be in a range from 20% to 40%, inclusive, of width W of upright part 122.

Anode lead terminal 120 and cathode lead terminal 130 can be formed by processing one metal sheet. Bent part 122*d* can be formed by removing a part of the metal sheet around bent part 122*d* and bending the metal sheet at a part to be bent part 122*d*. Bent part 122*d* may be formed without removing the metal sheet around the part to be bent part 122*d*. However, it is preferable to remove the part of the metal sheet around bent part 122*d* in view of easily disposing the exterior body (for example, mold resin).

Figure 5:
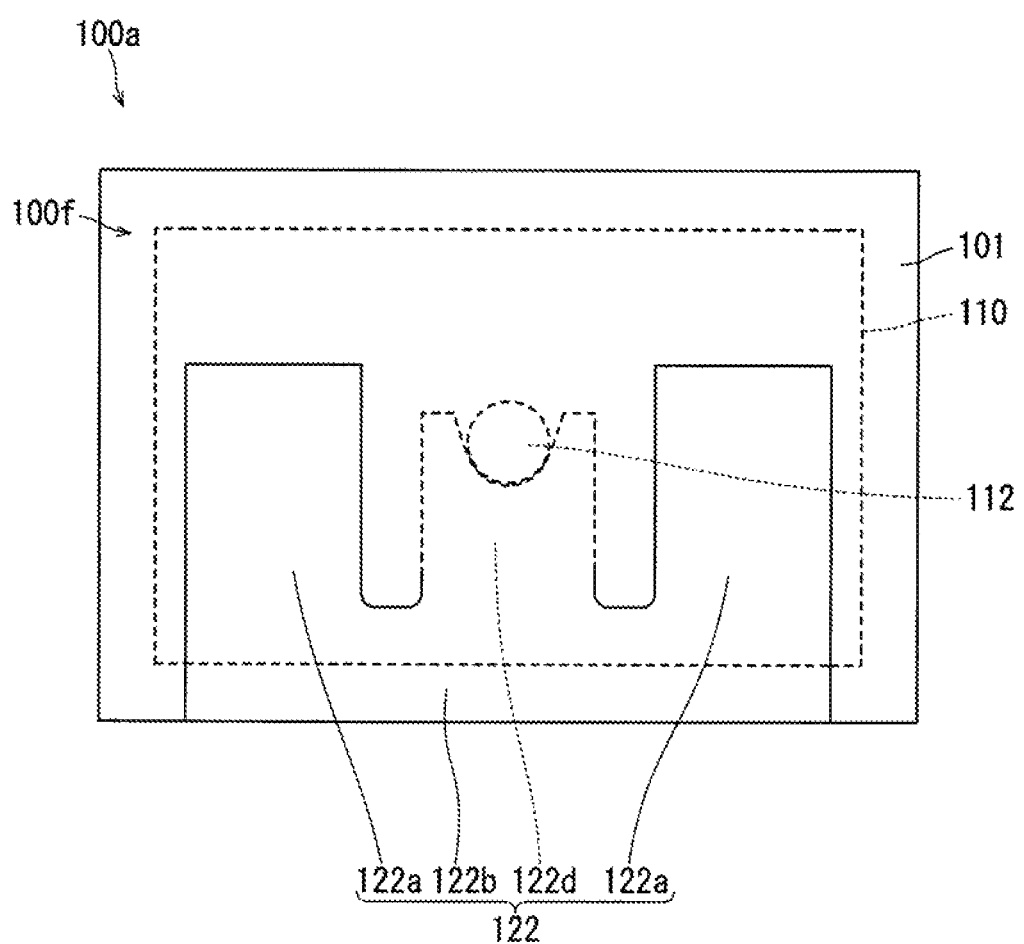
FIG. 5 is a front view schematically illustrating another example of the electrolytic capacitor of the present disclosure.

In FIGS. 1 to 3, an example in which upright part 122 includes upper part 122*c* has been described, but upright part 122 may not include upper part 122*c*. FIG. 5 illustrates a front view of an example of such electrolytic capacitor 100*a*. Also in electrolytic capacitor 100*a*, the same effects as those of electrolytic capacitor 100 can be obtained.

Referring to FIG. 3, capacitor element 110 includes anode part 111 and cathode part 115. Anode part 111 includes anode body 113 having dielectric layer 114 formed on a surface thereof, and anode lead 112. Cathode part 115 includes electrolyte layer 116 disposed so as to cover dielectric layer 114, and cathode layer 117. Cathode layer 117 includes, for example, a carbon layer formed on electrolyte layer 116, and a metal particle layer formed on the carbon layer. The metal particle layer is, for example, a layer formed using a metal paste.

Cathode lead terminal 130 includes cathode terminal part 131 and second upright part 132. Cathode terminal part 131 is exposed at bottom surface 100*b*. Second upright part 132 rises from cathode terminal part 131 and is exposed on rear surface 100*r*. In electrolytic capacitor 100, second upright part 132 and cathode part 115 (specifically, cathode layer 117) are connected by conductive member 141. Conductive member 141 is a layer formed using, for example, a metal paste.

As described above, anode part 111 of capacitor element 110 is electrically connected to anode lead terminal 120, and cathode part 115 of capacitor element 110 is electrically connected to cathode lead terminal 130. When electrolytic capacitor 100 is mounted on a substrate or the like of an electronic device, it may be mounted by soldering anode terminal part 121 and cathode terminal part 131 to each other.

Figure 6:
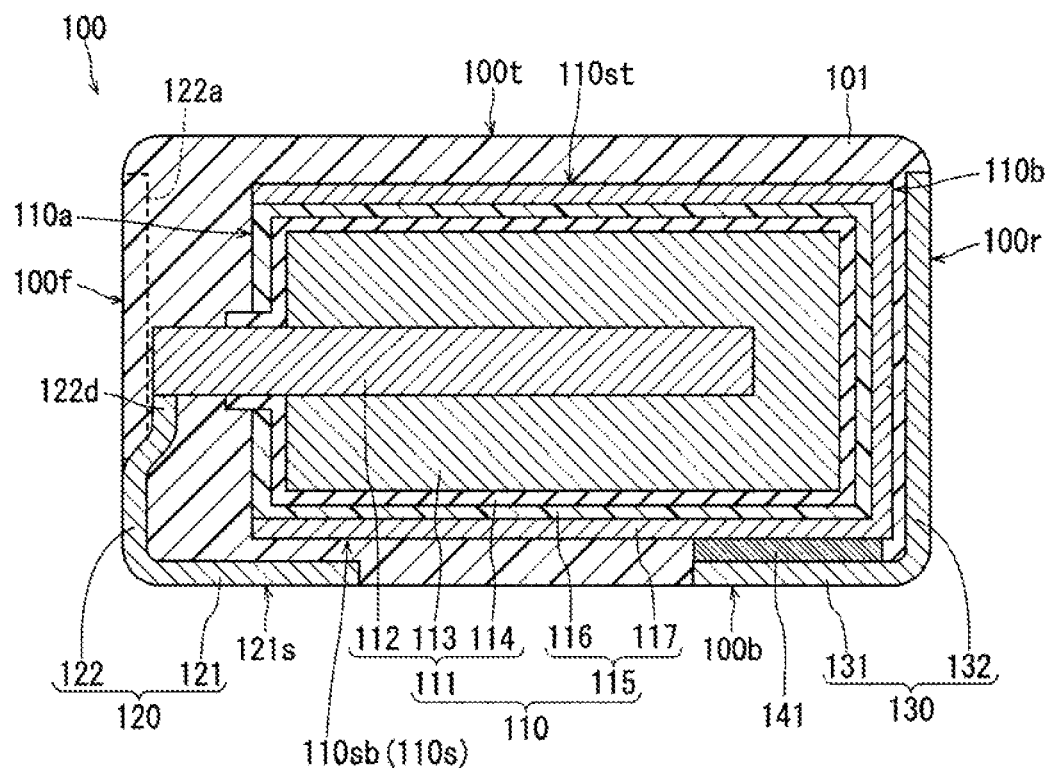
FIG. 6 is a cross-sectional view schematically illustrating another example of the electrolytic capacitor of the present disclosure.
Figure 7:
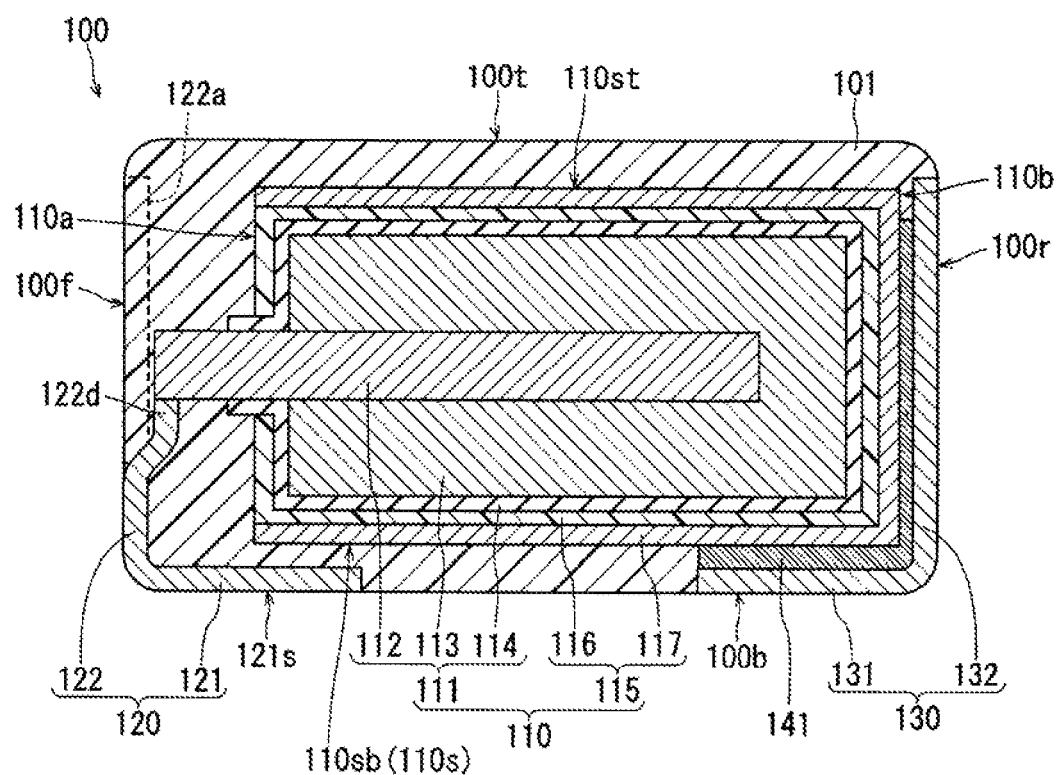
FIG. 7 is a cross-sectional view schematically illustrating another example of the electrolytic capacitor of the present disclosure.

Note that, as illustrated in FIG. 6, cathode lead terminal 130 and capacitor element 110 may be connected via conductive member 141 disposed between cathode terminal part 131 and side circumferential surface 110*s* (specifically, bottom surface 110*sb*) of capacitor element 110. Alternatively, as illustrated in FIG. 7, cathode lead terminal 130 and capacitor element 110 may be connected via conductive member 141 disposed between cathode terminal part 131 and side circumferential surface 110*s* (specifically, bottom surface 110*sb*) of capacitor element 110, and conductive member 141 disposed between second upright part 132 and second end surface 110*b*.

An example of a method of manufacturing electrolytic capacitor 100 will be described below. First, capacitor element 110, anode lead terminal 120, and cathode lead terminal 130 are prepared. A method of manufacturing capacitor element 110 is not particularly limited, and the capacitor element can be manufactured by a known method. Anode lead terminal 120 and cathode lead terminal 130 can be formed by a known metal processing method. In an example of the case of forming anode lead terminal 120, first, in the metal sheet to be anode lead terminal 120, a part of a periphery of bent part 122*d* and a part of recess 122*dg* are punched out and removed, and a part to be bent part 122*d* is formed by press working. Next, the metal sheet is bent at a boundary between first upright part 122 and anode terminal part 121 so that the first upright part rises from the anode terminal part. In this way, anode lead terminal 120 can be formed.

Next, anode lead 112 and anode lead terminal 120 are connected, and cathode layer 117 and cathode lead terminal 130 are connected. Anode lead 112 and anode lead terminal 120 can be connected to each other by, for example, disposing the tip part of anode lead terminal 120 in recess 122*dg* of bent part 122*d* and then welding both. Cathode layer 117 and cathode lead terminal 130 can be connected by, for example, the following method. First, a metal paste is applied to second upright part 132 of cathode lead terminal 130 and/or second end surface 110*b* of capacitor element 110 (surface of cathode layer 117). Next, after both are bonded with the metal paste interposed therebetween, the metal paste is heated to be converted into conductive member 141. In this way, cathode layer 117 and cathode lead terminal 130 can be connected to each other.

Next, the capacitor element is sealed with a material (for example, mold resin) of exterior body 101. A sealing step can be performed by a known method. In this way, electrolytic capacitor 100 can be manufactured. Note that other electrolytic capacitors of the present disclosure can also be manufactured by the same manufacturing method.

The present disclosure can be used for an electrolytic capacitor.

What is claimed is:

1. An electrolytic capacitor including a bottom surface, a front surface rising from the bottom surface, and a rear surface opposite to the front surface, the electrolytic capacitor comprising:
    a capacitor element including a first end surface facing the front surface;
    an anode lead terminal and a cathode lead terminal each electrically connected to the capacitor element; and
    an exterior body disposed around the capacitor element, wherein:
    the capacitor element includes an anode lead protruding from the first end surface toward the front surface,
    the anode lead terminal includes an anode terminal part exposed on the bottom surface, and a first upright part rising from the anode terminal part,
    the first upright part includes two exposed parts, a lower part connecting lower ends of the two exposed parts, and a bent part extending from the lower part between the two exposed parts, the two exposed parts being connected to the anode terminal part and exposed on the front surface, the bent part having a recess at a tip of the bent part,
    the bent part is bent toward the first end surface so that the recess is disposed in the exterior body,
    a tip part of the bent part where the recess is formed extends substantially in a direction perpendicular to a surface of the anode terminal part, and
    the anode lead is connected to the recess of the bent part.

2. The electrolytic capacitor according to claim 1, wherein:

the first upright part includes an upper part connecting upper ends of the two exposed parts, the anode lead terminal is formed by processing one metal sheet, and the bent part is formed by bending a portion of the metal sheet that is surrounded by the two exposed parts, the upper part, and the lower part.

3. The electrolytic capacitor according to claim 1, wherein:

the capacitor element includes a second end surface opposite to the first end surface, and a side circumferential surface connecting a peripheral edge of the first end surface and a peripheral edge of the second end surface, the cathode lead terminal includes a cathode terminal part exposed on the bottom surface, and a second upright part rising from the cathode terminal part, the second upright part being exposed on the rear surface, and the cathode lead terminal and the capacitor element are connected to each other via at least one of a conductive member disposed between the second upright part and the second end surface or a conductive member disposed between the cathode terminal part and the side circumferential surface.

4. The electrolytic capacitor according to claim 1, wherein:

the anode lead has a round bar shape, and the recess of the anode lead terminal has an arc shape along a transverse outer periphery of the round bar shape of the anode lead.

5. An electrolytic capacitor including a bottom surface, a front surface rising from the bottom surface, and a rear surface opposite to the front surface, the electrolytic capacitor comprising:

a capacitor element including a first end surface facing the front surface;

an anode lead terminal and a cathode lead terminal each electrically connected to the capacitor element; and an exterior body disposed around the capacitor element, wherein:

the capacitor element includes an anode lead protruding from the first end surface toward the front surface, the anode lead terminal includes an anode terminal part exposed on the bottom surface, and a first upright part rising from the anode terminal part, the first upright part includes two exposed parts, an upper part connecting upper ends of the two exposed parts, and a bent part disposed between the two exposed parts, the two exposed parts being connected to the anode terminal part and exposed on the front surface, the bent part having a recess at a tip of the bent part, the bent part is bent toward the first end surface so that the recess is disposed in the exterior body, and the anode lead is connected to the recess of the bent part.

6. The electrolytic capacitor according to claim 5, wherein a tip part of the bent part where the recess is formed extends substantially in a direction perpendicular to a surface of the anode terminal part.

7. The electrolytic capacitor according to claim 5, wherein:

the first upright part includes a lower part connecting lower ends of the two exposed parts, and the bent part extends from the lower part.

8. The electrolytic capacitor according to claim 7, wherein:

the anode lead terminal is formed by processing one metal sheet, and the bent part is formed by bending a portion of the metal sheet that is surrounded by the two exposed parts, the upper part, and the lower part.

9. The electrolytic capacitor according to claim 5, wherein:

the capacitor element includes a second end surface opposite to the first end surface, and a side circumferential surface connecting a peripheral edge of the first end surface and a peripheral edge of the second end surface, the cathode lead terminal includes a cathode terminal part exposed on the bottom surface, and a second upright part rising from the cathode terminal part, the second upright part being exposed on the rear surface, and the cathode lead terminal and the capacitor element are connected to each other via at least one of a conductive member disposed between the second upright part and the second end surface or a conductive member disposed between the cathode terminal part and the side circumferential surface.

10. The electrolytic capacitor according to claim 5, wherein:

the anode lead has a round bar shape, and the recess of the anode lead terminal has an arc shape along a transverse outer periphery of the round bar shape of the anode lead.

* * * * *